July 1, 1941.  G. C. PAPENDICK  2,247,694
SLICED BREAD-LOAF FRACTIONATING MACHINE
Filed Nov. 25, 1938  5 Sheets-Sheet 1
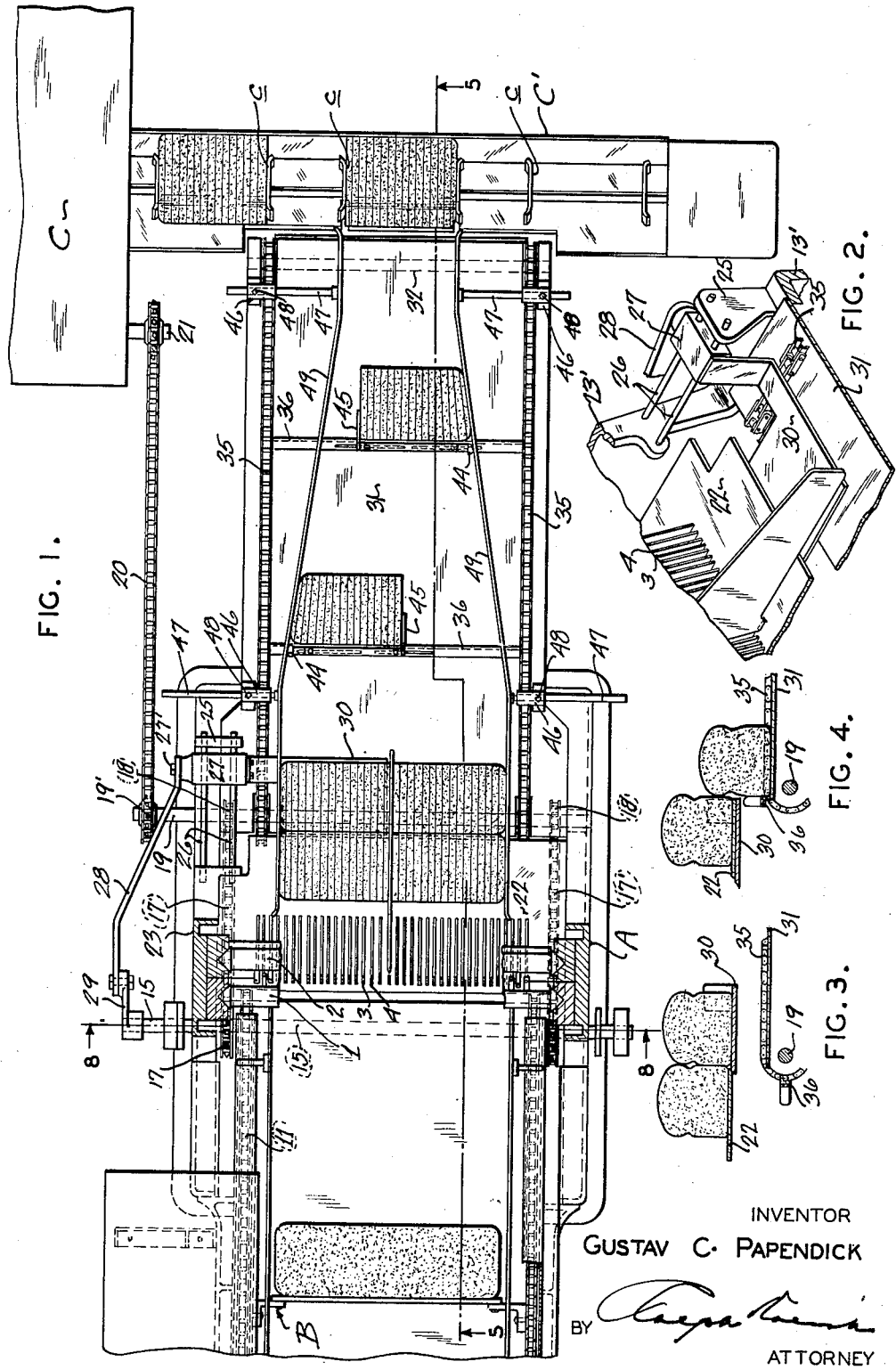
INVENTOR
GUSTAV C. PAPENDICK
ATTORNEY July 1, 1941. G. C. PAPENDICK 2,247,694
SLICED BREAD-LOAF FRACTIONATING MACHINE
Filed Nov. 25, 1938 5 Sheets-Sheet 2
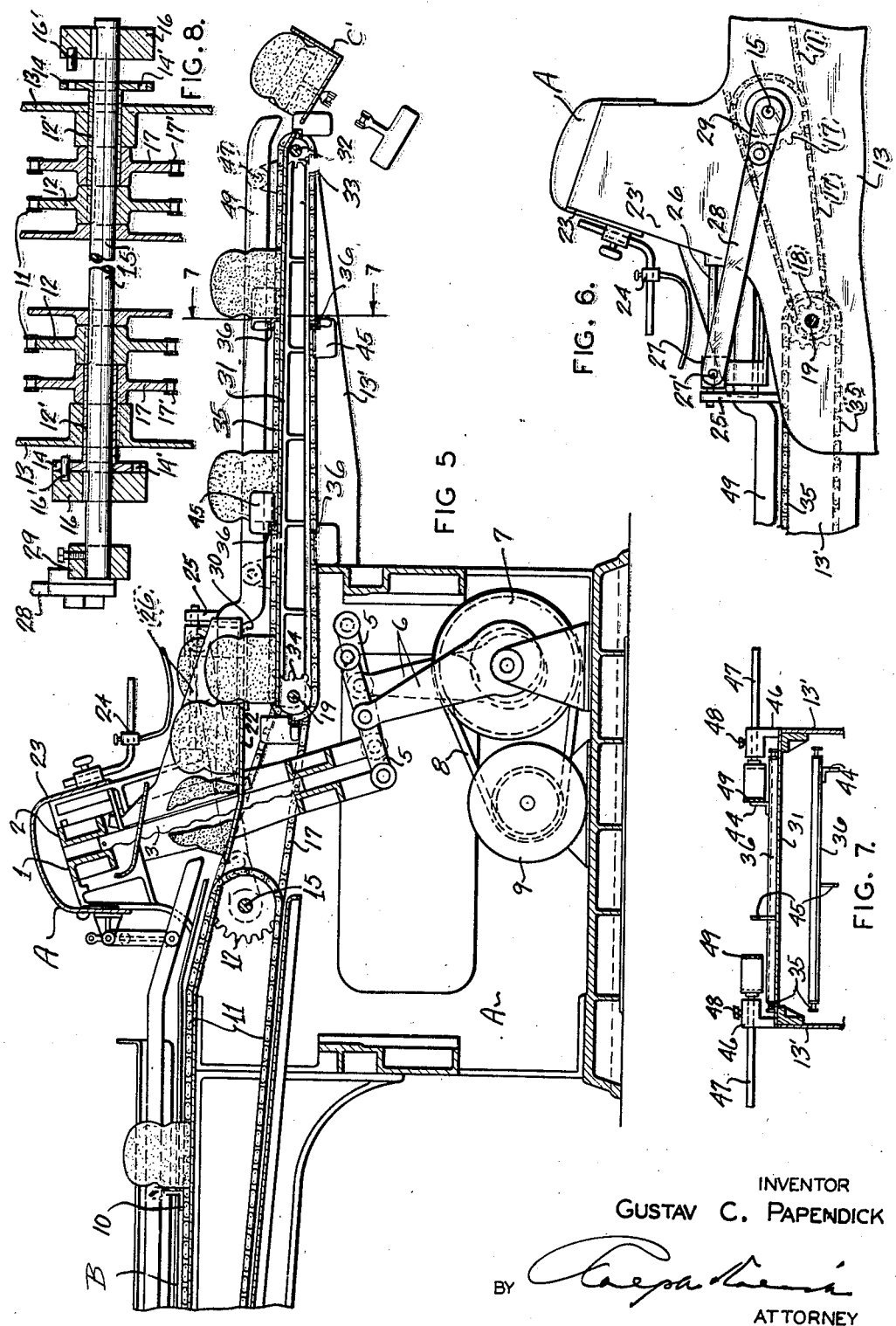
INVENTOR
GUSTAV C. PAPENDICK
ATTORNEY July 1, 1941.   G. C. PAPENDICK   2,247,694
SLICED BREAD-LOAF FRACTIONATING MACHINE
Filed Nov. 25, 1938   5 Sheets-Sheet 3

INVENTOR
GUSTAV C. PAPENDICK
BY
ATTORNEY

July 1, 1941.  G. C. PAPENDICK  2,247,694
SLICED BREAD-LOAF FRACTIONATING MACHINE
Filed Nov. 25, 1938  5 Sheets-Sheet 4

INVENTOR
GUSTAV C. PAPENDICK
BY
ATTORNEY

July 1, 1941.   G. C. PAPENDICK   2,247,694
SLICED BREAD-LOAF FRACTIONATING MACHINE
Filed Nov. 25, 1938   5 Sheets-Sheet 5

INVENTOR
GUSTAV C. PAPENDICK
BY
ATTORNEY

Patented July 1, 1941

2,247,694

UNITED STATES PATENT OFFICE 2,247,694

SLICED BREAD-LOAF FRACTIONATING MACHINE

Gustav C. Papendick, University City, Mo.; Elizabeth Papendick executrix of Gustav C. Papendick, deceased, assignor to Papendick, Inc., St. Louis, Mo., a corporation of Missouri Application November 25, 1938, Serial No. 242,433

17 Claims. (Cl. 146—153)

This invention relates to certain new and useful improvements in sliced bread-loaf fractionating machines and has for its primary object the provision of a machine which will automatically sub-divide respective sliced bread-loaves into a plurality of fractions in a simple, speedy, and efficient manner without materially adding to the production cost of the bread-loaves, which will fractionate or sub-divide the bread-loaves at high speed in timed relation to the other bread production processes, and which will provide the consumer trade with tasty and fresh fractionated or sub-divided bread-loaves, which may be wrapped or packaged for direct visual inspection.

And with the above and other objects in view, my invention resides in the novel features of form, construction, arrangement, and combination of parts presently described and pointed out in the claims.

In the accompanying drawings (5 sheets)—

Figure 1 is a top plan view of a sliced bread-loaf fractionating machine constructed in accordance with and embodying my present invention;

Figure 2 is a fragmentary detail perspective view of one form of separator plate forming a part of my present invention;

Figure 9:
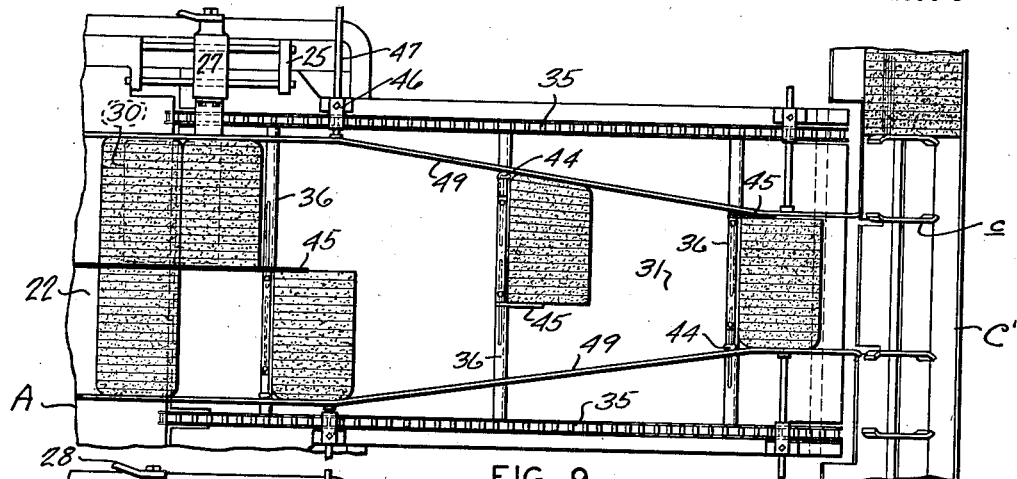
Figure 10:
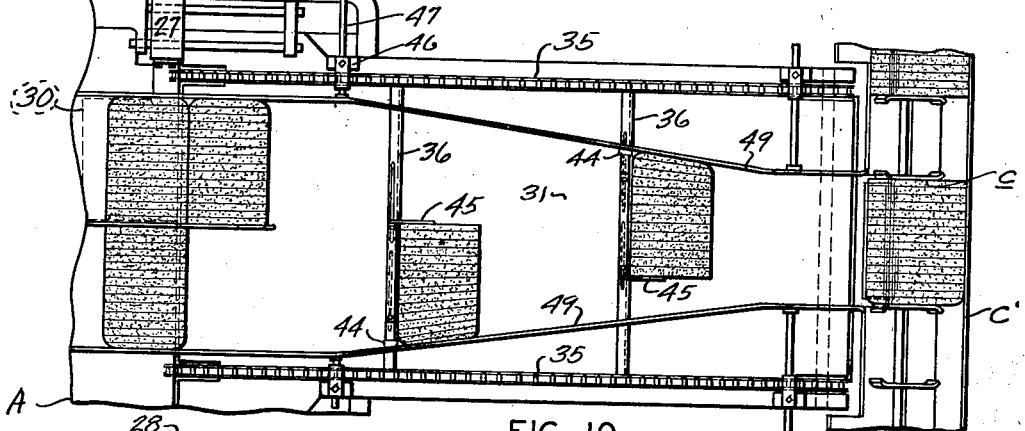
Figure 11:
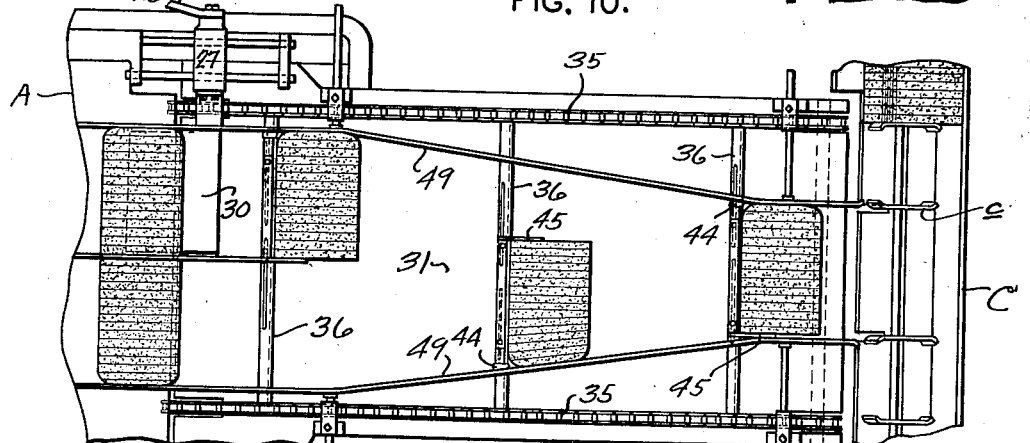
Figure 12:
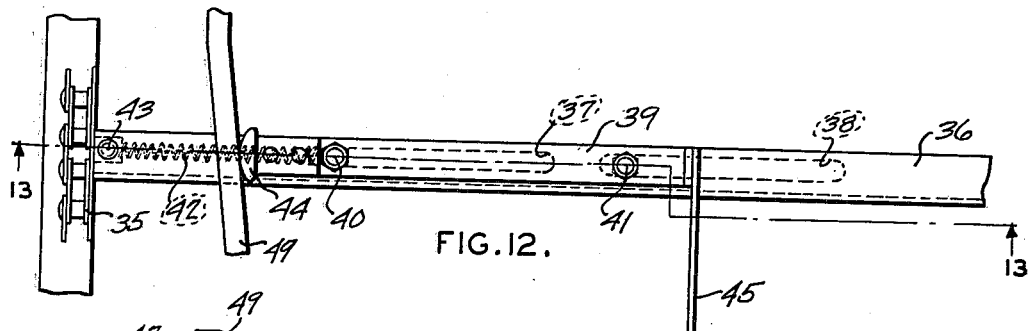
Figure 13:
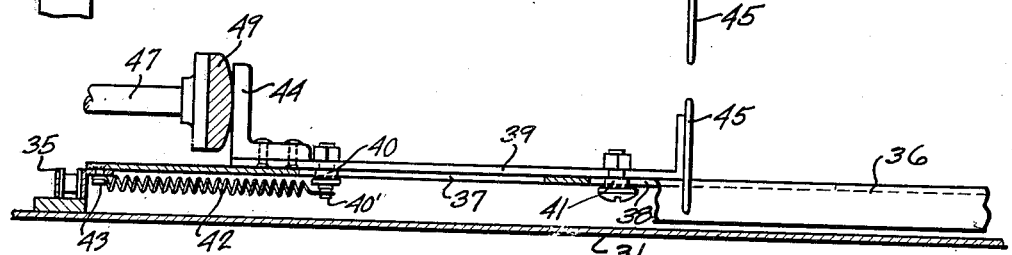
Figure 14:
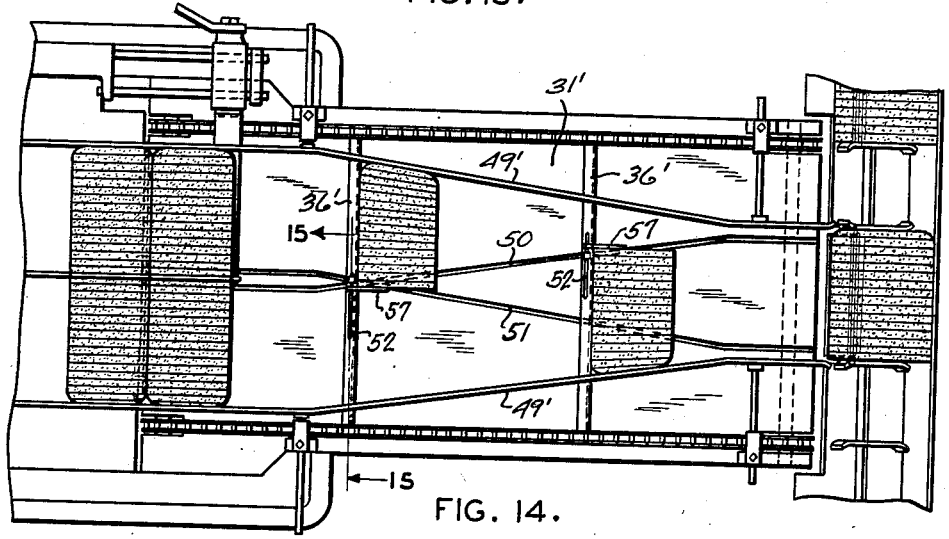
Figure 15:
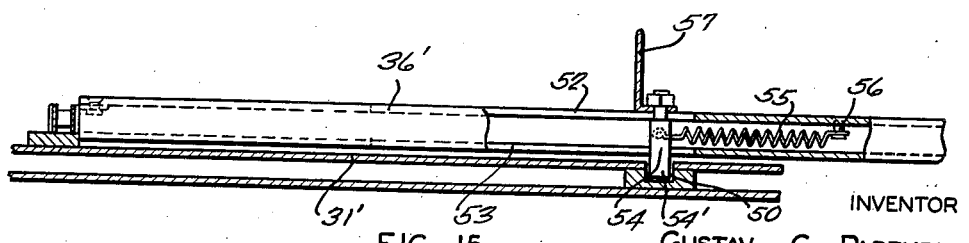
Figure 16:
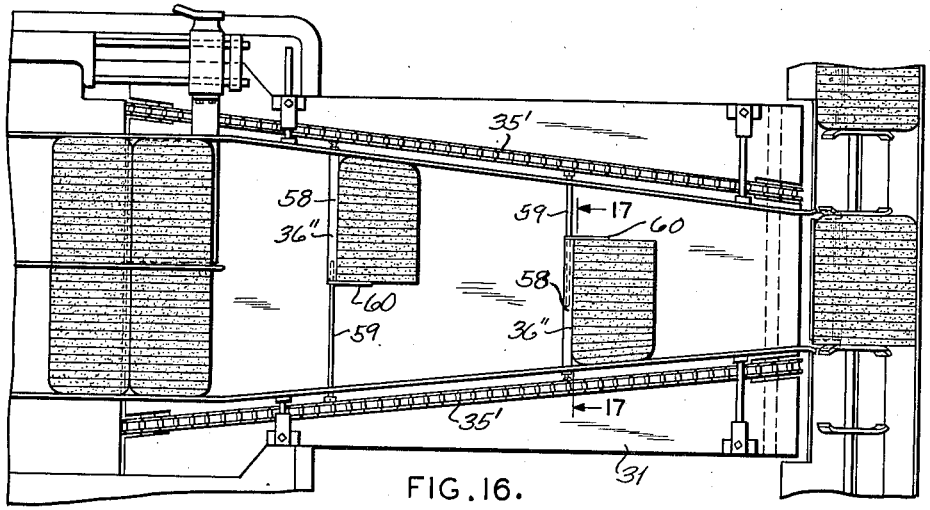
Figure 17:
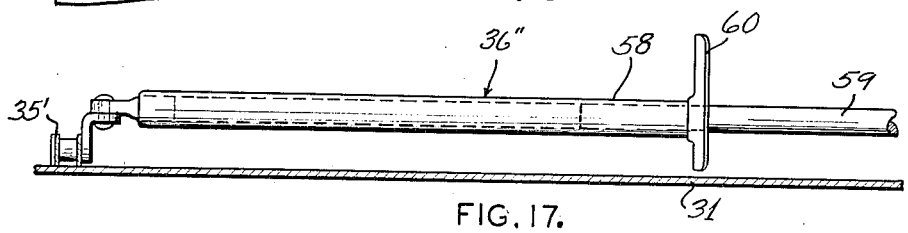
Figure 18:
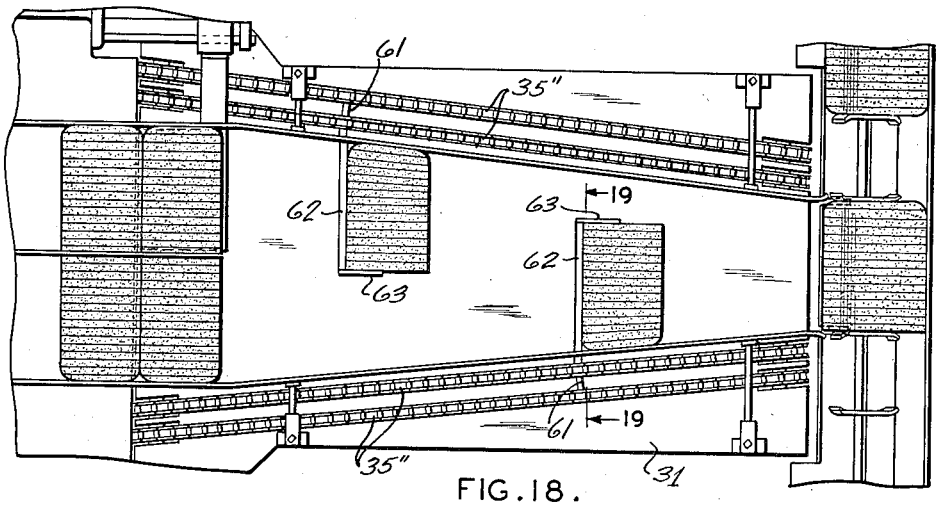
Figure 19:
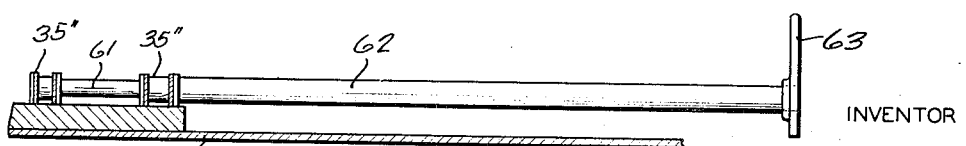

Figures 3 and 4, respectively, are fragmentary vertical sectional views of the separator plate in the two extreme positions of its operation;

Figure 5 is a sectional view of the sliced loaf fractionating machine, taken approximately along the line 5—5, Figure 1;

Figure 6 is a fragmentary elevational view of the separator plate actuating mechanism forming a part of my present invention;

Figure 7 is a transverse sectional view of the sliced loaf fractionating machine, taken approximately along the line 7—7, Figure 5;

Figure 8 is a fragmentary transverse sectional view of the separator plate actuator drive mechanism, taken approximately along the line 8—8, Figure 1;

Figures 9, 10, and 11 are diagrammatic top plan views of the sliced loaf fractionating means in various stages of loaf fractionating operation;

Figure 12 is a fragmentary top plan view of the fractionating flight of my present invention;

Figure 13 is a fragmentary vertical sectional view of the fractionating flight, taken approximately along the line 13—13, Figure 12;

Figure 14 is a top plan view of a first modified form of loaf fractionating means;

Figure 15 is a vertical sectional view of the fractionating flight of the first modified form of my present invention, taken approximately along the line 15—15, Figure 14;

Figure 16 is a top plan view of a second modified form of loaf fractionating means;

Figure 17 is a vertical sectional view of the fractionating flight of the second modified form of my present invention, taken approximately along the line 17—17, Figure 16;

Figure 18 is a top plan view of a third modified form of loaf fractionating means; and Figure 19 is a vertical sectional view of the fractionating flight of the third modified form of my present invention, taken approximately along the line 19—19, Figure 18.

Referring now in more detail and by reference characters to the drawings, which illustrate preferred embodiments of my present invention, A designates a loaf-slicing machine which includes a pair of vertically reciprocable knife frames 1, 2, each having a plurality of spaced parallel knife blades 3, 4, the frames 1, 2, being operably connected for reciprocating actuation through link members 5 and connecting rods 6 to a pulley-type fly-wheel 7, which is, in turn, operably connected, as by means of a belt 8, to a suitable prime mover, such as the electric motor 9.

Mounted forwardly of the slicing mechanism proper, is a loaf-feeding conveyer B preferably of the chain-driven flight type and including a plurality of pusher flights 10 operatively mounted on and extending between parallel sprocket chains 11 trained over sprockets 12. Rotatively mounted in and extending through the side frames 13 of the slicing machine A, are axially aligned short tubular shafts or quills 12' integrally provided on their extended ends with indexing-disks 14 each having an annular series of apertures 14'. Rotatively mounted in and extending through the tubular shafts or quills 12' is a drive shaft 15 for drivingly supporting the sprockets 12. Shiftably keyed on the extended ends of the shaft 15 are indexing wheels 16 each having an axially projecting pin 16' for retentive driving engagement in a selected aperture 14'. Keyed on the quills 12' are sprockets 17, in turn, connected by means of an intermediate drive chain 17' to drive sprockets 18 fixed upon a transfer conveyer drive shaft 19 also operatively journaled in the side frames 13 and provided at its outer end with a sprocket 19', over which is trained a main drive chain 20, whereby the main drive shaft 19 is driven from a rotating shaft 21 directly connected in any conventional manner to the main driving mechanism of the wrapping machine C, all as best seen in Figure 1 and for purposes presently more fully appearing.

Rigidly mounted on, and extending horizontally between, the side frames 13 of the slicing machine A, is a receiving plate 22 positioned on the discharge side of the slicing frames 1, 2, for receiving the sliced bread-loaves. Adjustably mounted on the slicer-head framework 23, is a conventional hold-down plate assembly 24 for abutting engagement with the upwardly presented surface of the sliced bread-loaf as it issues onto the receiving plate 22 for preventing accidental upward displacement of the slices, as best seen in Figure 5 and for purposes presently more fully appearing.

Mounted at their ends respectively in, and disposed horizontally between, an upstanding bracket 25 and one of the vertical post members 23' of the slicer-head 23, is a pair of parallel rods 26 spaced upwardly from, and extending along, the upper margin of a side frame 13. Slidably mounted on the rods 26, is a shiftable block 27 provided at its outer end with a bearing stud 27' for rotatory connection with one end of a link 28, which is, in turn, at its other end rotarily connected to a crank arm 29, the latter being keyed upon the extended end of the feed conveyer drive shaft 15 for rotation therewith. Mounted on the inner end of the block 27 for reciprocation therewith, is a separator plate 30 positioned for slidable movement just beneath the receiving plate 22 and having a width slightly greater than the width of a bread-loaf, so that a bread-loaf will rest fully thereon when the plate is in outwardly extended position, as shown in Figure 3.

The separator plate 30 furthermore, as shown, extends transversely across beneath the receiving plate 22, terminating at substantially the midpoint thereof for separating the sliced bread-loaf into two equal fractions or halves, although, it will be clearly understood that this separator plate 30 may be lengthened or shortened for the purposes of sub-dividing the bread-loaf into unequal fractions or duplicated a plurality of times, depending upon the number of fractions into which the loaf is to be divided. It will, of course, be evident in this connection that, as the feed conveyer drive shaft 15 is rotated, the separator plate 30 will be reciprocatorily moved rearwardly in timed relation with the driving mechanism into substantially underlying registration with the receiving plate 22, as best seen in Figure 4 and for purposes presently more fully appearing.

Extending forwardly from the discharge end of the slicing machine A and rigidly supported along its side margins in the side frame extensions 13', is a transfer conveyer table 31 terminating at its inner end above the main drive shaft 19 and at its outer end above an idler shaft 32 suitably journaled at its ends in the side frame extensions 13' and provided with two sprockets 33 in peripheral alignment with two similar sprockets 34 rigidly mounted on the main shaft 19. Trained over each of the aligned sprockets 33, 34, are parallel flight chains 35 provided with a plurality of spaced parallel transversely extending tubular flight bars 36 each operatively mounted at its ends in the chains 35 for movement therewith.

Each of the flight bars 36 is provided with two axially aligned upwardly presented longitudinally extending slots 37, 38. Mounted flatwise upon the upwardly presented face of the flight bar 36, is a preferably flat bar 39 having a length substantially equal to the length of the loaf fraction or sections into which the sliced bread-loaf is to be divided and being provided at its opposite ends with a pair of downwardly extending studs 40, 41, for bar retentive slidable disposition through the slots 37, 38, the stud 40 being provided at its lower end with a downwardly extending projection 40' for engagement with one end of a tension spring 42, which is, in turn, at its other end fixed to the flight bar 36 by means of a pin or rivet 43.

At its outer end, the flat bar 39 is rigidly provided with an upstanding shoe 44 and at its inner end with a forwardly extending end-gripper plate 45 which extends downwardly in front of the flight bar 36, terminating at a point slightly above the upper surface of the transfer conveyer table 31.

Each of the side frame extensions 13' is provided on its upwardly presented face, and preferably adjacent either end, with transversely apertured bosses 46 for slidably receiving sideguide supporting rods 47 mounted therein for transverse shiftable movement to any desired position of adjustment, in which adjusted position they may be held by set screws 48. Rigidly mounted on the inner ends of the guide rods 47, are side guides 49 extending at one end adjacent the outer margin of the conveyer table 31 and being then bent inwardly for a substantial distance and extending angularly inwardly across the conveyer table 31 and being finally bent forwardly for extension parallel to the longitudinal margin of the conveyer table 31. The side guide 49 on the one side of the conveyer table 31 is of opposite shape to the side guide on the other side of the table, the side guides being so adjusted that at the inner end of the transfer conveyer table 31 they are spaced transversely by a distance equal to the full width of the loaf and at the outer end of the conveyer table 31 adjacent the wrapping machine conveyer mechanism C' they are positioned centrally of the table 31 and spaced apart by a distance equal to the length of the loaf fraction, as best seen in Figure 1.

In mounting the flight bars 36 between the chains 35, every other flight bar is reversed end for end. Thus, on one flight bar 36 the upstanding shoe 44 will engage the inwardly presented face of one side guide 49, whereas on the next succeeding flight bar 36 the shoe 44 will engage the inwardly presented vertical face of the opposite or other side guide 49, in either case pushing the flat bar 39 and the associated end gripper plate 45 inwardly as the flight bars 36 move forwardly, thus maintaining the end gripper plate 45 at a constant distance from the inner face of the side guides 49.

As has been above pointed out, the separator plate 30 is reciprocated in a predetermined timed relation with both the transfer and feed conveyer. Furthermore, as has been above pointed out, for purposes of illustration, a half loaf fractionating mechanism has been described. Hence, the flight bars 36 move forwardly preferably at twice the lineal speed of the feed conveyer mechanism. Thus, as the bread-loaves are progressed through the slicing knives, a particular loaf will move outwardly on the receiving plate 22 and continue forwardly over the edge thereof. Half of the loaf will fall directly down upon the surface of the transfer conveyer table 31, whereas the other half of the loaf will move onto the separator plate 30. As the first half falls upon the transfer conveyer, one of the flight bars 36 will be moved upwardly from beneath the conveyer table into engagement with the loaf section, the end gripper plate 45 of the flight bar 36 being in such position as to come into abutting engagement with the crustless end face of the inner slice of the loaf fraction for preventing the slices from falling over as the loaf fraction is progressed forwardly. This first loaf fraction, under the influence of the flight bar 36, is accelerated and moved forwardly at increased speed. Meanwhile the second half of the bread-loaf has been pushed somewhat forwardly across the separator plate but is still retentively held thereby. As soon as the first bread-loaf fraction, which is already moving across the transfer conveyer table 31, has been moved forwardly out of the way of the second loaf fraction, the separator plate 30 will be drawn rearwardly beneath the receiving plate 32 and the second section will drop down upon the transfer conveyer table 31 just as the next succeeding flight bar 36 comes up from beneath the table 31 and starts moving forwardly thereacross. Hence the second section will now be gripped and held by this next succeeding flight bar 36 and progressed forwardly behind the first loaf fraction.

Thus, the loaf fractions will be delivered in a continuous consecutive series at the discharge end of the transfer conveyer table 31 into the so-called pockets c of the wrapping machine conveyer C', which are moved intermittently in the conventional manner by a Geneva movement or other drive means (not shown), each pocket being brought to rest momentarily in front of the discharge ends of the side guides 49, as shown in Figure 1, for receiving a loaf fraction and progressing it into the wrapping machine for conventional handling. As the flight bars pass over the discharge end of the transfer conveyer table 31 and push the loaf fraction into one of the pockets c of the wrapping machine conveyer C' and pass under the conveyer table 31, the shoe 44 will leave the side guide 49 with which it is in engagement and the flat bar 39 and its associated end gripper plate 45 will be drawn backwardly to original position under the influence of the spring 42.

If desired, a transfer conveyer table 31' may be provided with two slide-ways 50, 51, extending longitudinally down the central portion thereof, having two straight portions intermediately connected with an angularly extending portion parallel to the angularly extending portion of the side guides 49', all as best seen in Figure 14.

A plurality of flight rods 36' are provided, each having a longitudinally extending upwardly presented slot 52 and a downwardly presented slot 53 in registration with the slot 52. Disposed through and extending on either end beyond the slots 52, 53, for laterally shiftable movement therein, is a pin 54 attached intermediate its ends to one end of a tension spring 55, which is, in turn, at its other end rigidly attached to the flight bar 36' by means of a suitable pin or rivet 56 for normally urging the pin toward the center of the flight rod. Rigidly mounted on the upper extended end of the pin 54, is an end gripper plate 57 substantially similar in design and function to the end gripper plate 45 previously described.

For the same purposes previously mentioned, the flight bars 36' are alternately reversed end for end, so that the lower extended ends 54' of the various pins 54 of half of the flight rods will engage in the slide-way 50, whereas the lower extended ends 54' of the other half of the flight rods will be engaged in the slide-ways 51. As the flight rod 36' comes up from beneath the table 31' and begins its loaf-pushing movement thereacross, the pin 54' will have been moved over under the influence of the spring 55 such that the lower extended end 54' of the spring will automatically enter the end of the particular one of the slide-ways 50, 51, and will travel therealong, so that the end gripper plate is shifted outwardly in the course of the forward movement of the flight rod 36' and maintained at a fixed distance from the particular side guide 49' with which it has loaf-supporting co-operation, all as best seen in Figure 14.

If desired, a pair of angularly inwardly running conveyor chains 35' may be provided having a plurality of telescoping flight rods 36'', including a tubular member 58 for axially accommodating a telescoping rod 59 and being provided at its inner end with an end gripper plate 60. In this instance, as in the previously described instances, the flight rods 36'' are alternately reversed end for end, so that the gripper plate 60 will alternately co-operate with first one and then the other of the side guides 49 for progressing first one and then the other of the sliced loaf halves or fractions.

Similarly, it is possible to provide parallel pairs of angularly running side chains 35'' provided with a transversely extending stud member 61 at right angles to the path of movement of the chain, which is, in turn, at its inwardly extended end provided with a flight bar member 62 extending only partially across the width of the conveyer table 31 at right angles to the longitudinal axis thereof and being provided at its inner extremity with an end gripper plate 63. The flight members are arranged in alternately spaced or staggered relationship first on one and then the other of the pairs of chains 35'', all as best seen in Figures 18 and 19.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is—

1. In a baked loaf fractionating machine, in combination, loaf-slicing means, conveyer means for progressing baked loaves through the slicing means, means for sub-dividing the sliced loaf into a plurality of separate fractions, and means for gripping separate fractions of the loaf in successive order and progressing said fractions away from the slicing means in sidewise consecutive order, said means including a plurality of spaced flights each having means for gripping only a single loaf-fraction and being arranged in successive groups, the flights in such groups being arranged each for gripping and progressing a different one of the fractions into which the loaf is divided.

2. In a baked loaf fractionating machine, in combination, loaf-slicing means, conveyer means for progressing baked loaves through the slicing means, means for gripping separate fractions of the loaf in successive order and progressing said fractions away from the slicing means in consective order, said means including a plurality of spaced flights arranged in successive groups, the flights in such groups being arranged each for gripping and progressing a different one of the fractions into which the loaf is divided, and means co-operable with each of the flights for shifting each fraction laterally during progressing movement.

3. In a loaf-slicing and fractionating machine, a transfer conveyer having a plurality of lengthwise extending side guides, and a plurality of driven flights, each including means for gripping an outwardly presented end-face of a loaf fraction and urging the fraction into endwise engagement with one of said guides.

4. In a loaf-slicing and fractionating machine, a transfer conveyer having a plurality of lengthwise extending side guides, a plurality of driven flights, a plate-member shiftably mounted on each flight for gripping an end face of a loaf fraction, and means operably connected with each of said plates for maintaining it at a fixed distance from a side guide throughout loaf-engaging movement.

5. In a loaf-slicing and fractionating machine, a transfer conveyer having a plurality of lengthwise extending side guides, a plurality of driven flights, each including means for gripping an outwardly presented end-face of a loaf fraction and urging the fraction into endwise engagement with one of said guides, and means for mounting the gripping means in a predetermined spaced relation to a selected side guide.

6. In a loaf-slicing and fractionating machine, a transfer conveyer having a plurality of lengthwise extending side guides, a plurality of driven flights, a plate-member shiftably mounted on each flight for gripping an end face of a loaf fraction, spring means for normally urging said plate toward a selected side guide, and means operably connected with each of said plates for maintaining it at a fixed distance from a side guide throughout loaf-engaging movement.

7. In a device of the character described, a tubular flight rod, a bar shiftably mounted in the rod, and a plate member operably mounted on and shiftable with the bar.

8. In a device of the character described, a slotted tubular flight rod, a bar shiftably mounted in the rod, and a plate member operably mounted on and shiftable with the bar.

9. In a device of the character described, a slotted tubular flight rod, a bar shiftably mounted in the rod, and a plate member having means projecting through the slot and operably mounted on the bar.

10. In a device of the character described, a slotted tubular flight rod, a bar shiftably mounted in the rod, a plate member having means projecting through the slot and operably mounted on the bar, and spring means for normally urging the bar in a predetermined direction.

11. In a loaf fractionating machine, a conveyer table having a pair of opposed side guides and a pair of centrally positioned lengthwise extending track-slots, a pair of continuous drive chains operably mounted on the table, a plurality of flight rods operably mounted between the chains, each of said rods having a shiftable plate for engagement with an end of a loaf fraction, and a tongue on each of said plates having engagement in one of said track slots for positioning the plate during movement over the table.

12. In a loaf fractionating machine, a conveyer table having a pair of opposed side guides and a pair of centrally positioned lengthwise extending track-slots respectively parallel to said guides, a pair of continuous drive chains operably mounted on the table, a plurality of flight rods operably mounted between the chains, each of said rods having a shiftable plate for engagement with an end of a loaf fraction, and a tongue on each of said plates having engagement in one of said track slots for positioning the plate during movement over the table.

13. In a loaf fractionating machine, a conveyer table, a pair of opposed side guides, each being for a portion of its length disposed angularly inwardly with respect to the longitudinal axis of the table, two pairs of drive chains, said pairs being respectively parallel to the inclined portions of the side guides, and a plurality of flight rods, each supported at one end in and moved by one of said pairs of chains.

14. In a loaf fractionating machine, a conveyer table, a pair of opposed side guides, each being for a portion of its length bent angularly inwardly with respect to the longitudinal axis of the table, two pairs of drive chains, said pairs being respectively parallel to the inclined portions of the side guides, and a plurality of flight rods, each disposed at right angles to the longitudinal axis of the table and being operatively mounted at one end in and moved by one of said pairs of chains.

15. In a loaf fractionating machine having means for subdividing a sliced loaf into a plurality of fractions, a conveyer table having a pair of opposed side guides and a pair of centrally positioned lengthwise extending track-slots, a pair of continuous drive chains operably mounted on the table, a plurality of flight rods operably mounted between the chains, said rods being arranged in groups, each rod within the group being adapted for engagement with a different loaf-fraction, each of said rods having a shiftable plate for retentive abutment with an end-face of the engaged loaf-fraction, and a tongue on each of said plates having engagement in one of said track-slots for positioning the plate during movement over the table.

16. In a loaf fractionating machine, a conveyer table, a pair of opposed side guides, each being for a portion of its length disposed angularly inwardly with respect to the longitudinal axis of the table, two pairs of drive chains, said pair being respectively parallel to the inclined portions of the side guides, and a plurality of flight rods, each being free at one end and supported at the other end in and moved by one of said pairs of chains.

17. In a loaf fractionating machine, a conveyer table, a pair of opposed side guides, each being for a portion of its length disposed angularly inwardly with respect to the longitudinal axis of the table, two pairs of drive chains, said pairs being respectively parallel to the inclined portions of the side guides, and a plurality of flight rods, each supported at one end in and moved by one of said pairs of chains, the rods of the one pair of chains being arranged in staggered relation to the rods of the other pair of chains for progressing first one and then another of the several fractions of each loaf.

GUSTAV C. PAPENDICK.